United States Patent

[11] 3,569,984

[72] Inventor Christopher Alan Watson
Takeley, England

[21] Appl. No. 742,304
[22] Filed July 3, 1968
[45] Patented Mar. 9, 1971
[73] Assignee International Standard Electric Corporation
New York, N.Y.
[32] Priority July 14, 1967
[33] Great Britain
[31] 32459/67

[54] MAGNETIC RECORDING HEAD WITH A VARIABLE SIZE GAP
8 Claims, 13 Drawing Figs.

[52] U.S. Cl. .......... 346/74, 179/100.2, 340/174.1
[51] Int. Cl. .......... G01d 15/12, G11b 5/22
[50] Field of Search .......... 346/74 (MC); 179/100.2 (T), 100.2 (CB); 340/174.1 (F)

[56] References Cited
UNITED STATES PATENTS

| | | | |
|---|---|---|---|
| 3,108,281 | 10/1963 | Uemura et al. | 346/74 |
| 3,391,254 | 7/1968 | Honig | 179/100.2 |

*Primary Examiner*—Bernard Konick
*Assistant Examiner*—Gary M. Hoffman
*Attorneys*—C. Cornell Remsen, Jr., Walter J. Baum, Percy P. Lantzy, Philip M. Bolton, Isidore Togut and Charles L. Johnson, Jr.

ABSTRACT: A magnetic recording head having a single tapered magnetic recording gap extending across the width of a recording medium which moves transversely thereto. A signal to be recorded, represented by pulses of alternating polarity and sequentially decreasing magnitudes, is applied to a signal winding which develops a magnetic flux for magnetizing the recording medium to positive and negative saturated states, depending upon the polarity of the pulses. Due to the decreasing magnitude of the pulses and to the tapered magnetic recording gap, varying widths of the recording medium are driven to the aforesaid saturated states, causing successive portions in time of the signal to be recorded transversely in spatial sequence across the width of said medium.

Inventor
CHRISTOPHER A. WATSON
By Percy P. Lantzy
Attorney

Inventor
CHRISTOPHER A. WATSON
By Percy P. Lantzy
Attorney

Inventor
CHRISTOPHER A. WATSON
By [signature]
Attorney

Inventor
CHRISTOPHER A. WATSON
By Percy P. Lantzy
Attorney

MAGNETIC RECORDING HEAD WITH A VARIABLE SIZE GAP

BACKGROUND OF THE INVENTION

The invention relates to a magnetic recording head.

Magnetic recorders storing signals at high speed and/or at a high packing density frequently resort to the placement of successive signal elements transversely across the width of the tape or other storage medium, i.e. at right angles to the direction of tape motion. This has the advantage of reducing the actual tape velocity but requires either a multiplicity of heads with associated switching circuits or the mechanical transverse movement of a single head.

The undesirability of using a large number of heads, with, inevitably, a complex signal distribution network, emphasizes the simplicity of feeding a single serial waveform into but one moving head. However, the mechanical limitations of such a device, particularly in a high speed magnetic recorder, are such as to limit the applications of this arrangement.

SUMMARY OF THE INVENTION

The invention provides a magnetic recording head comprising pole members which form a tapered magnetic recording gap and first means for creating, due to an electrical signal applied thereto, in coupling means which couple said first means to said tapered magnetic recording gap, a magnetomotive force which is in the form of a series of pulses of one polarity and decreasing magnitude, each one of said pulses being followed by at least one other pulse which is of the opposite polarity and lesser in magnitude, wherein during the period of time said electrical signal is applied to said first means the alternating series of magnetomotive force pulses cause between said pole members and alternating magnetic field thereby causing a strip of a magnetic recording medium situated below said tapered magnetic recording gap to be magnetized alternately to a positive and to a negative saturated state, and wherein due to said tapered magnetic recording gap the length of the said strip of recording medium which is magnetically saturated depends on the magnitude of each of said magnetomotive force pulses, therefore a series of magnetized images are caused to be recorded in spatial sequence on said magnetic recording medium.

The foregoing and other features according to the invention will be better understood from the following description with reference to the accompanying drawings, in which:

DESCRIPTION OF THE PREFERRED EMBODIMENT

Figures 1A, 1B, 2:
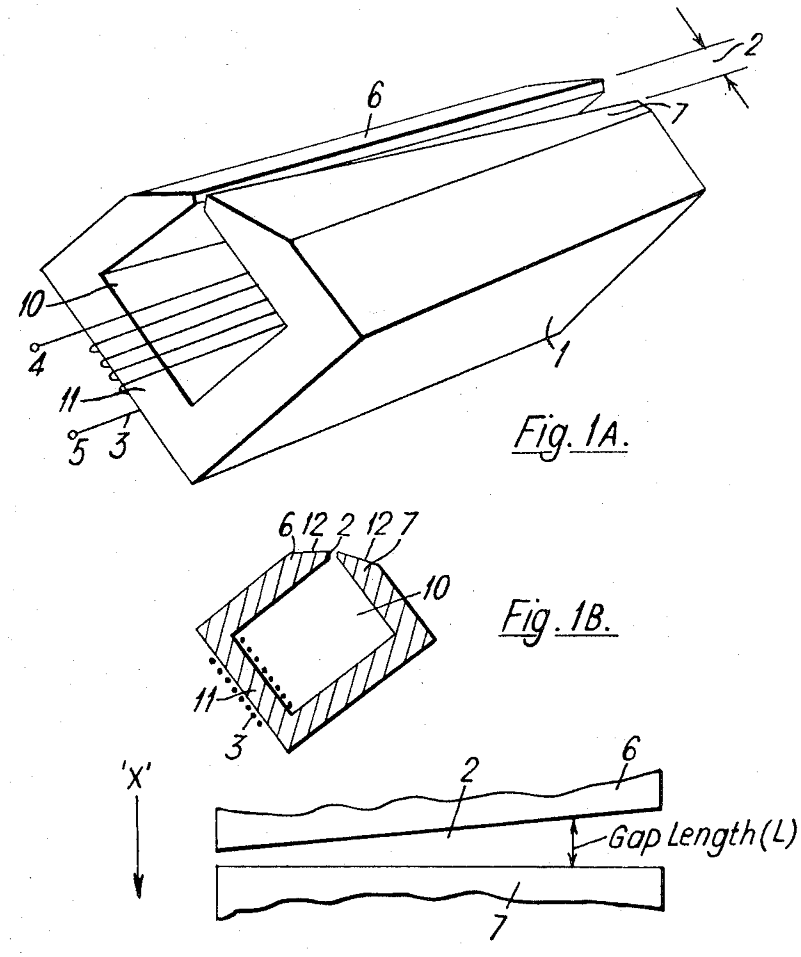
FIG. 1A shows a pictorial view of a diagrammatical representation of the magnetic recording head according to the invention.
FIG. 1B shows a cross-sectional end elevation of the magnetic recording head shown in the drawing according to FIG. 1A.
FIG. 2 illustrates the scanning action of the magnetic recording head shown in the drawings according to FIGS. 1A and 1B.

Referring to FIG. 1A, a pictorial view of a diagrammatical representation of the magnetic recording head according to the invention is shown which basically comprises a main body 1 having formed therein a tapered magnetic recording gap 2 which in practice could have a contour which varied in accordance with any desired law, for example, linear, exponential, or logarithmic, and an aperture 10 to provide a former 11 around which a signal winding 3 is wound which is terminated at each end thereof at the terminals 4 and 5.

As can be seen from the drawing according to FIG. 1B which is a cross-sectional end elevation of the magnetic recording head shown in the drawing according to FIG. 1A, the main body 1 is formed by a generally square tube member of a 'soft' material, the pole pieces 6 and 7 on either side of the tapered magnetic recording gap 2 which have chamfered edges 12 are formed by adjacent sides of the main body 1 and the former 11 is formed by one of the other sides of the main body 1. It is to be noted that the cross section of the main body 1 may be of any desired shape, the main criterion being that the main body should have a minimum of three sides i.e. two adjacent sides for the pole pieces 6 and 7 and the third side for the former, which may or may not be formed as an integral structure.

A 'soft' material is defined as a material which does not retain magnetism permanently, but loses most of it when the magnetizing field is removed.

Figures 3, 4:
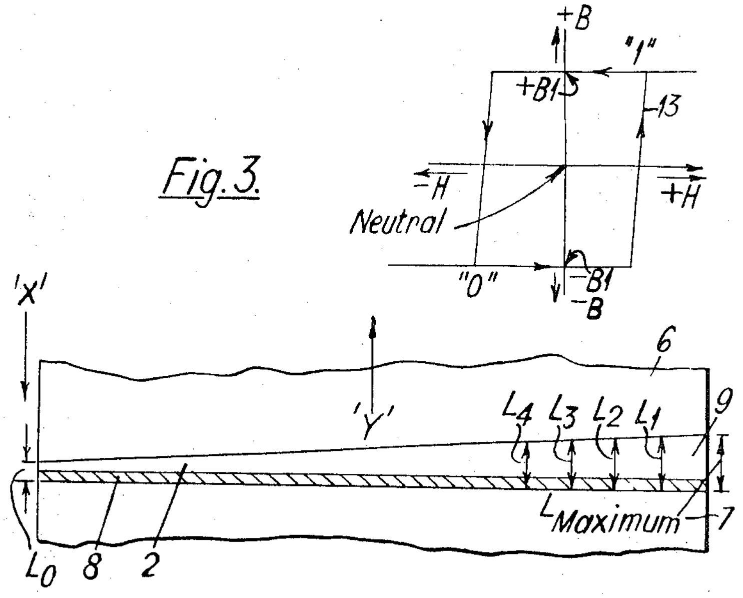
FIG. 3 shows a B—H curve for the material on which the magnetic recording head shown in the drawings according to FIGS. 1A and 1B records.
FIG. 4 illustrates the operating principles of the magnetic recording head shown in the drawings according to FIGS. 1A and 1B.

FIG. 2 illustrates the scanning action of the magnetic recording head shown in the drawings according to FIGS. 1A and 1B; and for the purposes of the subsequent description it is assumed that the contour of the tapered magnetic recording gap 2 varies linearly and that the recording medium, for example, a magnetic tape or other magnetic storage medium having a rectangular hysteresis loop 13 as shown in the drawing according to FIG. 3 is moved relative to the tapered magnetic recording gap 2 in the direction of arrow X. Therefore, the pole piece 6 will be the leading pole piece and the pole piece 7 will be the trailing pole piece.

Now, $$H = \frac{M.M.F.}{L} \qquad (1)$$

where $H$ the magnetic field intensity in the magnetic recording gap 2 between the pole pieces 6 and 7,

*m.m.f.* = the magnetomotive force in the magnetic recording gap 2 between the pole pieces 6 and 7, $L$ = the length of the magnetic recording gap 2 between the pole pieces 6 and 7, and $$M.M.F. = \frac{4\pi NI}{10} \text{ Gilberts} \qquad (2)$$

where $N$ = the number of times the signal winding 3 links a magnetic path and $I$ = the current flowing in the signal winding 3.

For a given critical magnetic field $H_c$, which is sufficient to drive the recording medium 9 to a saturated state of the rectangular hysteresis loop 13 shown in the drawing according to FIG. 3, and a given *m.m.f.*, it is evident from equations (1) and (2) that there will be a critical magnetic recording gap length $L_c$.

For $L>L_c$, then $H<H_c$ and for $L<L_c$, then $H>H_c$.

Thus by varying the *m.m.f.* amplitude i.e. the ampere turns ($N \times T$) in equation (2) the position along the width of the magnetic recording head of the critical magnetic recording gap length $L_c$ will vary.

The operating principles of the magnetic recording head shown in the drawings according to FIGS. 1A and 1B are illustrated in the drawing according to FIG. 4 wherein the direction of movement of the magnetic recording medium 9 relative to the tapered magnetic recording gap 2 is again represented by the arrow X and wherein the arrow Y indicates the direction of the original recording medium magnetization. It is assumed that the recording medium 9 has been driven or otherwise caused to be in the saturated state 0 of the rectangular hysteresis loop 13 shown in the drawing according to FIG. 3 and allowed to relax to the magnetized condition −B1. The shaded area 8 represents the zone of the recording medium 9 which is influenced by the trailing pole piece 7 as the recording medium 9 is moved relative to the magnetic recording head.

Figure 5:
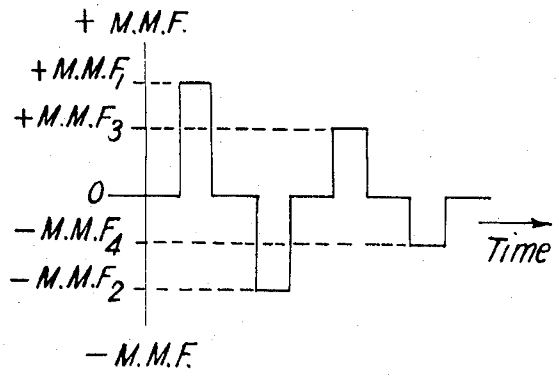
FIG. 5 shows the *m.m.f.* waveforms which are applied to the magnetic recording head shown in the drawings according to FIGS. 1A and 1B.

If the signal winding 3 is energized with a current of say 10 units at a time $T_1$, this current being sufficiently high to give rise to the positive $m.m.f._1$ shown in the drawing according to FIG. 5 which causes the critical magnetic field intensity $+H_c$ between the pole pieces 6 and 7 to appear at the position $L_{MAX}$, the shaded area 8 between the positions $L_o$ to $L_{MAX}$ will be driven to the saturated state 1 of the rectangular hysteresis loop 13 shown in the drawing according to FIG. 3. Upon removal of the current of 10 units, the shaded area 8 between the positions $L_o$ to $L_{MAX}$ will relax to a magnetized condition +B1 on the B–H curve shown in the drawing according to FIG. 3. If at a time $t_2$ which is later than the time $t_1$ a current of 9 units, which is of reverse direction to the current of 10 units i.e. −9 units. is then applied to the signal winding 3, the negative $m.m.f._2$ (see FIG. 4) due to this current will cause the critical magnetic field intensity $-H_c$ to appear at the position $L_1$ thereby causing the remanent state of the shaded area 8 between the positions $L_o$ to $L_1$ to be reversed i.e. driven to the saturated state 0 of the rectangular hysteresis loop 13. Hence upon removal of this current of −9 units the shaded area 8 between the positions $L_1$ and $L_{MAX}$ will be left in the state 1 i.e. at the magnetized condition +B1 and the shaded area 8 between the positions $L_o$ to $L_1$ will relax to a magnetized condition −B1.

This process may be repeated by applying the positive $m.m.f._3$ as shown in FIG. 5 to cause the critical magnetic field intensity $+H_c$ to appear at the position $L_2$ then apply the negative $m.m.f._4$ as shown in FIG. 5 to cause the critical magnetic field intensity $-H_c$ to appear at the position $L_3$ thereby leaving the shaded area 8 between the positions $L_2$ and $L_3$ to be left in the magnetized condition +B1.

The process may be repeated several times by applying alternate current pulses of opposite sense and decreasing amplitude to the signal winding 3 thereby progressively leaving the desired magnetized pattern i.e. discrete elements of the shaded area 8 in the state 1, on the surface of the recording medium 9 between the positions $L_o$ and $L_{MAX}$.

If the recording medium is moved passed the magnetic recording gap 2 in the direction of the arrow X then it will be possible to cover its entire surface area with whatever pattern is required by appropriate control of the *m.m.f.* waveform shown in the drawing according to FIG. 5.

Thus in operation a current waveform which gives rises to a driving *m.m.f.* waveform similar to the waveform shown in the drawing according to FIG. 5, which comprises a series of pulses, alternate pulses being of opposite polarity and the magnitude of each pulse being less than the magnitude of the preceding one by an amount which is equivalent to the length of the recording medium below the magnetic recording gap 3 which is to be left in a magnetized state, is applied to the signal winding 3 and after a predetermined time a series of discrete elements of the recording medium surface are left in a magnetized state. At the instant the current waveform has caused the necessary series of discrete elements of the recording medium surface below the magnetic recording gap 2 between the positions $L_o$ to $L_{MAX}$ to be left in a magnetized state i.e. the condition +B1, the recording medium 9 is moved by appropriate means in the direction of the arrow X such that the next length of the recording medium 9 onto which the next magnetic pattern is to be recorded is positioned beneath the magnetic recording gap 3 i.e. it occupies the shaded area 8. When the recording medium 9 is relocated, the next current waveform is applied to the signal winding 3. Alternatively, the recording medium 9 could be moved continually instead of intermittently relative to the magnetic recording head according to the invention in which case the necessary current waveform would also be continually applied to the signal winding 3.

It can be seen from the above description with reference to the drawing according to FIG. 4 that it is necessary to effect precise control of the driving *m.m.f.* (or ampere turns) in order to achieve high resolution. In order to achieve a definition of the order of 160 zones per inch, a total of 320 *m.m.f.* levels would be needed. As magnetic recording head structures of several inches in width are envisaged and as practical ratios of $L_{MAX}$ to $L_o$ are likely to be limited to approximately 10:1 (implying a ratio of $m.m.f._{MAX}$ to $m.m.f._{MIN}$ of 10:1 also) it will be necessary to use a multiplicity of windings in place of the single signal winding 3 shown in the drawing according to FIG. 1A.

The multiplicity of windings may take many forms, for example it may take the form of a binary type of winding arrangement i.e. of turns which increase in the manner of a binary code (1, 2, 4, 8, 16, 32 etc.). Then by providing a few levels of current only and applying them to the multiple winding, the appropriate windings may be switched into circuit at the appropriate time to give the desired result i.e. a multilevel *m.m.f.* waveform.

It may be that the two magnetomotive force pulses which define any one of the discrete magnetized elements on the surface of the recording medium 9 are displaced relative to the magnetomotive force pulses associated with adjacent preceding magnetized element by a fairly long time interval; and the practical problems involved in the construction of an input signal circuit to generate and couple the necessary current waveform to the signal winding 3 to give rise to these magnetomotive force pulses may be somewhat simplified if the input signal circuit were arranged to generate a current waveform giving rise to a series of magnetomotive force pulses including a series of pulses of one polarity and decreasing amplitude, the 'write-in' pulse being included when required between any two of these pulses whose position coincided with the 'write-in' position.

Figure 6:
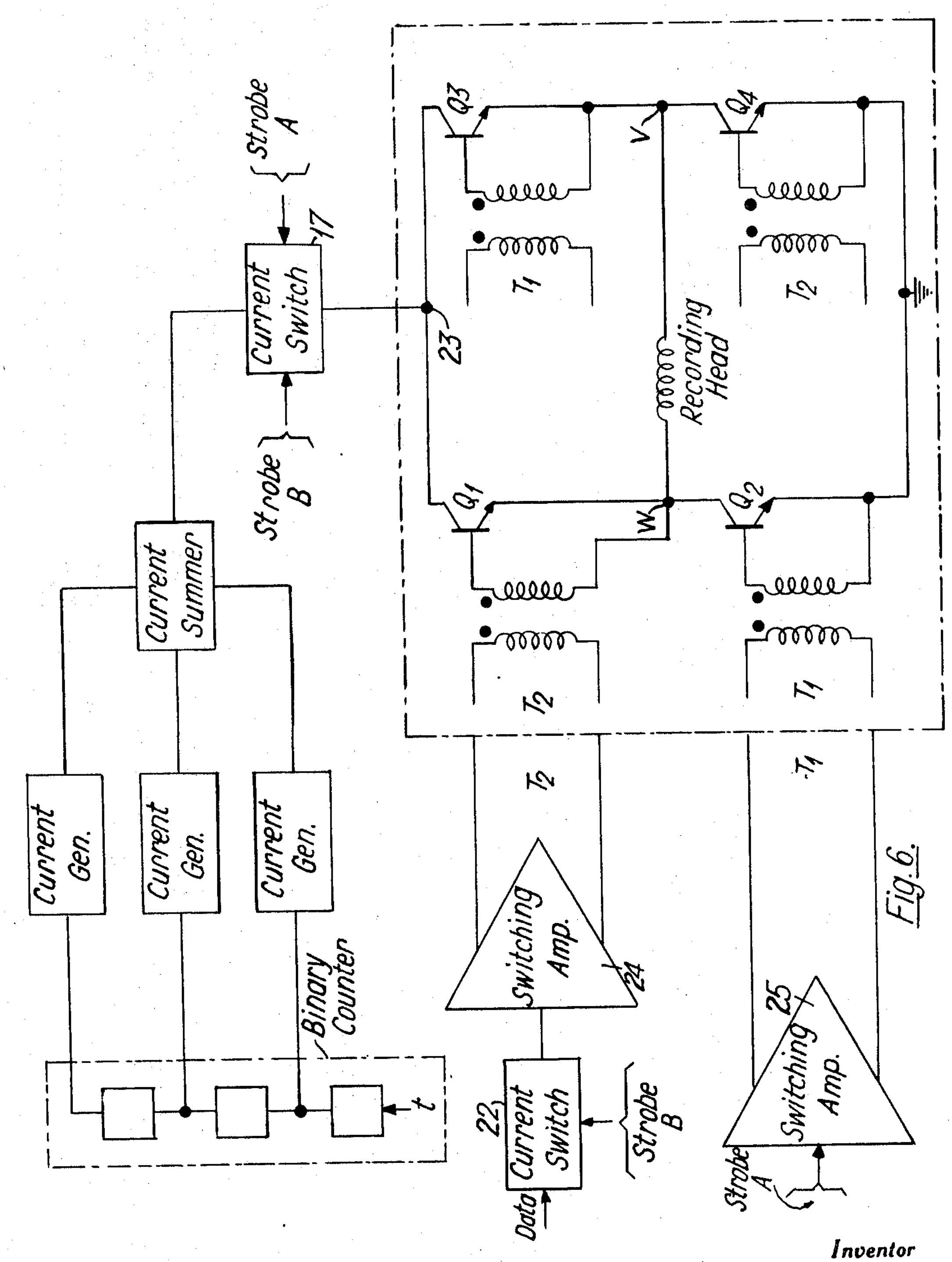
FIG. 6 is a diagram of a circuit which may be used to generate the *m.m.f.* waveforms shown in FIG. 5; and FIGS. *7a—7f* are graphical representations of waveforms appearing at various points of the circuit of FIG. 6.

An example of a circuit which may be used to provide the waveform of FIG. 5 is shown in FIG. 6 and its operation is explained with reference to FIGS. 7*a* through 7*f*.

Figure 7:
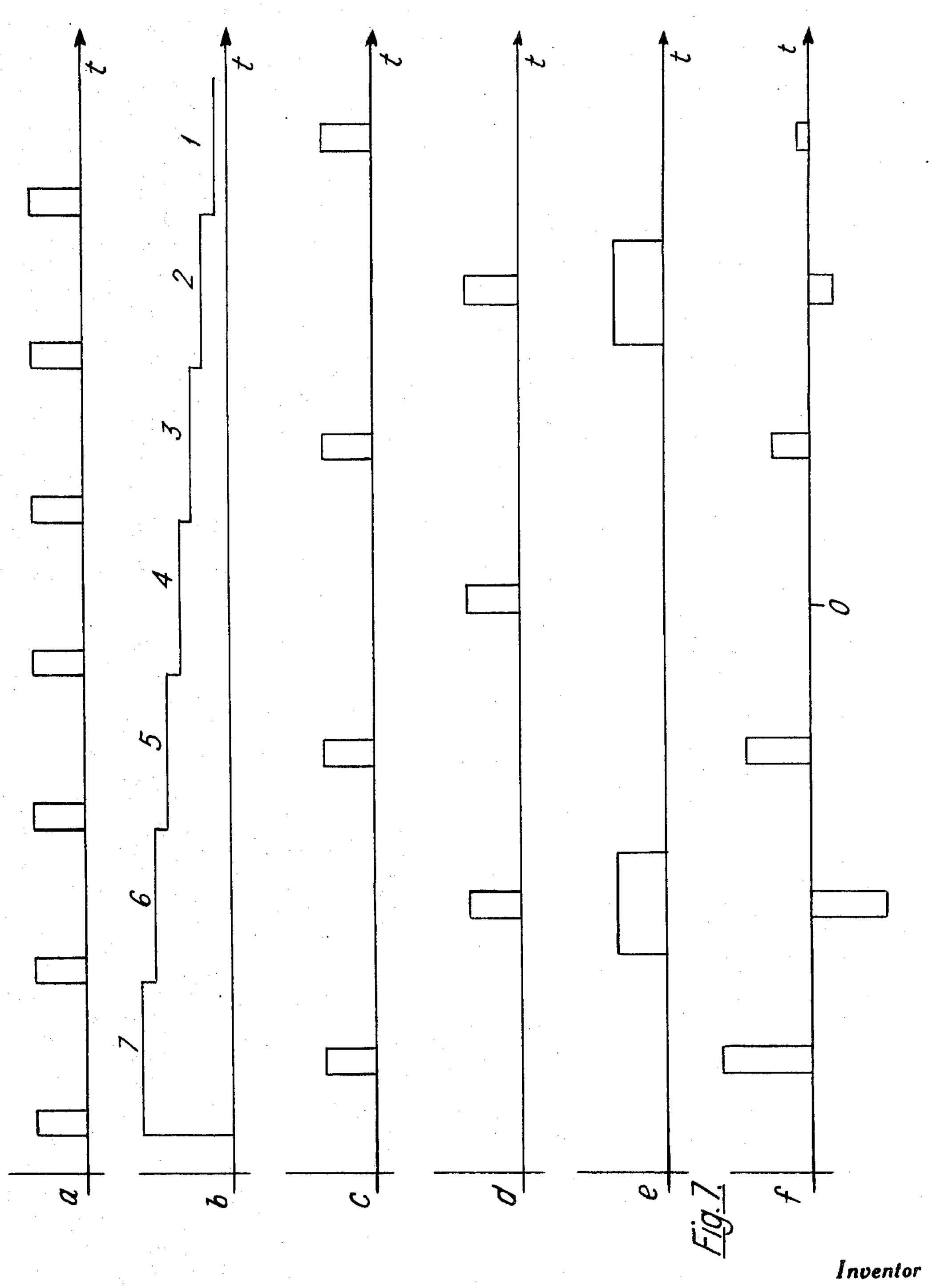

The timing pulses shown in FIG. 7*a* are provided to the binary counter shown in FIG. 6 which is conventional except for the outputs which are taken from the inverse side. This effectively causes the output to descend from seven to zero rather than the normal ascending count. The outputs of the stages of the binary counter are applied to current generators, and the outputs of the current generators are provided to a current summing device. A graphical representation of the current output from such a summing device versus time is shown in FIG. 7*b*. The waveform shown in FIG. 7*b* is then applied to a current switch 17 which is triggered by strobe pulses A or B as shown in FIGS. 7*c* and 7*d*, respectively.

Data in binary form, as shown in FIG. 7*e*, is provided to a current switch 22 which is activated by strobe B pulses, synchronizing the transmission of data with the pulse waveform being provided by the binary counter. The data pulses from the current switch 22 are transmitted to a switching amplifier 24 which amplifies the pulses, and which is connected to transformer $T_2$, providing input pulses which cause the recording of the data on the recording medium.

The input circuit for transformers $T_1$ are shown in FIG. 6 and consists of strobe A pulses being provided to a switching amplifier 25 which amplifies the pulses, causing application of the erase signal to the recording medium.

As above stated, current pulses from the summing device are provided to the current switch 17 of FIG. 6 and a path for the current will be provided by the occurrence of either a strobe pulse A or strobe pulse B. For example, the initial pulse of a transmitted cycle may produce a summing device output pulse of magnitude '7.' In this example the occurence of strobe pulse A causes the magnitude 7 pulse to be transmitted to the point designated 23 in the circuit of FIG. 6, and at the same time strobe pulse A causes a pulse to be provided to transformers $T_1$. The pulse input to transformers $T_1$ turns to transistors $Q_2$ and $Q_3$ on, while transistors $Q_1$ and $Q_4$ are quiescent since no input is provided to transformers $T_2$, as strobe pulse B has not occurred. For this reason the collector-emitter circuits of transistors $Q_2$ and $Q_3$ are short circuits, and the current at point 23 will follow the path through $Q_3$, the coil representing the recording head, from point V to point W, and $Q_2$ to ground. Current flowing in this direction "erases" the recording medium, and a magnitude 7 pulse will erase the entire width of the recording medium.

Next appearing at the output of the current summing device of FIG. 6 is a current pulse of magnitude 6 which (as indicated in FIG. 7*b*) which is transmitted to current switch 17, and a path for the pulse to point 23 is correspondingly provided by strobe pulse B. Strobe pulse B also provides a path for data appearing at the input of current switch 22, thus providing an output pulse from switching amplifier 24 to transformers $T_2$ upon the coincident arrival at current switch 22 of a data input pulse and a strobe B pulse. The pulse to transformers $T_2$ will turn transistors $Q_1$ and $Q_4$ on, while the absence of strobe pulse A causes transistors $Q_2$ and $Q_3$ to be in a quiescent state, the collector-emitter circuits of transistors $Q_2$ and $Q_4$ therefore being short circuits. At this time, the current at point 23 will follow the path to ground to $Q_1$, the coil representing the recording head from point W to point V, and $Q_4$ magnetization of the recording medium across that portion of its width determined by the magnitude of the pulse at point 23, as provided by the binary counter.

If, however, at the time that strobe pulse B occurs no data pulse appears at the input of current switch 22, no pulse is provided to transformers $T_2$ and transistors $Q_1$ and $Q_4$ are quiescent. Transistors $Q_2$ and $Q_3$ are also quiescent since no pulse has been provided to transformers $T_1$ due to the absence of the strobe A pulse. Under these conditions a current pulse arriving at point 23 will be blocked, preventing the flow of current through the coil representing the recording head, and therefore preventing any magnetization of the recording medium due to the particular pulse which has been transmitted from the binary counter.

FIG. 7*e* illustrates the data signal applied to current switch 2 when it is desired to record the binary information 101.

FIG. 7*f* illustrates the resultant current flow through the coil of FIG. 6, representing the recording head with a data input as illustrated in FIG. 7*e*. It will be noted that the positive, or erase pulses, travel from point W to point V, while the negative, or record pulses, travel from point W to point V.

In order to ensure that the discrete elements of the shaded area 8 of FIG. 4 which are driven to the state 1 are of the same length at any point along the width of the tapered magnetic recording gap 2 it may be necessary to either arrange that the leading pole piece is dropped back from the surface of the recording medium 9, cut teeth in the gap edge of either or both of the pole pieces 6 and 7 or arrange for either or both of the pole pieces 6 and 7 to be made from a high-coercivity magnetic material having a rectangular hysteresis loop as shown in the drawing according to FIG. 3.

A typical application of the magnetic recording head according to the invention is in nonpercussive printing machines wherein the recording medium would take the form of a drum which is rotated about its central axis; and as the surface of the drum moves past the magnetic recording head according to the invention the required information would be magnetically equivalent thereon. The latent magnetic image is then developed by passing the printing drum through a powder applicator which contains a powder that is attractive to the electromagnetically formed pattern.

The drum surface then comes in contact with the moving strip of paper which has the same linear velocity as the drum surface. A pressure roller presses the paper against the drum, and the powder pattern is transferred under pressure from the drum surface to the paper surface. It is the usual practice in such processes to include a thermal fixing agent, for example, resin or wax, in the powder formulation so that the pattern may be 'fixed' by the application of heat subsequent to pattern formation, therefore the paper strip after passing between the printing drum and the pressure roller is passed through heating means wherein the powder pattern is thermally bonded to the surface of the paper strip.

In a typical nonpercussive printing machine the printing drum is usually of the order of 8 inches wide and it may be required to record, say, 800 individual elements across the 8 inch width. The width of the pole pieces 6 and 7 on the magnetic recording head and thereby the width of the recording gap would therefore need to be 8 inches. Alternatively, a plurality of the magnetic recording heads shown in the drawings according to FIGS. 1A and 1B could be utilized which would need to be coupled together in end-to-end relationship and separated from each other by nonmagnetic spacers such that the overall length was of the order of 8 inches. For example, four magnetic recording heads, each one of which is approximately 2 inches long could be coupled together and separated from each other by nonmagnetic spacers, the thickness of which must not exceed the minimum spacing between the individual magnetized elements. If it so happened that the position of any one of the magnetized elements coincided with any one of the joints between the individual magnetic recording heads then it would not be recorded but by virtue of the definition mentioned previously its omission would not unduly blemish the magnetized pattern on the surface of the recording medium 9. Each of the individual heads which make up the magnetic recording head would be operated individually as previously described, in sequence, the electrical signals applied to the signal windings of each of the individual heads being synchronized such that they are switched into their respective magnetic recording head at the instant the preceding magnetic recording head has effected its recording action.

The magnetic recording head according to the invention may be utilized in many other applications where it is required to magnetically record information contained in an electrical signal onto a recording medium, for example, a magnetic tape as used in videotape or other types of magnetic recorders, in this application the magnetic pattern would be recovered by use of conventional replay heads.

It is to be understood that the foregoing description of specific examples of this invention is made by way of example only and is not to be considered as a limitation on its scope.

I claim:

1. A magnetic recording head arrangement for producing on a magnetizable recording medium moving adjacent and relative thereto a magnetic recording of the elements of received intelligence signals, comprising:

a. a magnetic pole structure including coupling means for receiving a waveform and pole members disposed transversely of the recording medium defining across the width of and adjacent to the medium a recording gap which varies increasingly in width from one end to the other according to a predetermined mathematical relationship;

b. a pulse signal waveform coupled to said magnetic pole structure for causing the received signal elements to be recorded on discreet portions of predetermined width of the recording medium, said waveform including a series of first polarity pulses of successively decreasing magnitude and a series of second polarity pulses interspaced between said first polarity pulses, said second polarity pulses being representative of the received intelligence signals, whereby the magnitude difference between successive first polarity pulses corresponds with said mathematical relationship to define said discreet portions of predetermined width; and c. means for providing said pulse signal waveform.

2. The magnetic recording head arrangement according to claim 1 wherein said means for providing said pulse signal waveform comprise:

a. first means for producing a repetitive stepped current waveform of progressively decreasing levels;

b. second means for establishing a current path through the recording head in either direction;

c. third means synchronized to said first means for providing to said second means at discreet intervals the waveform generated by said first means, and thereby periodically providing a path for current through the recording head in a first direction of magnitude corresponding to that of said stepped waveform; and d. fourth means, responsive to the received intelligence signals and synchronized with said third means for applying current pulses to said second means to provide a path for current through the recording head in the other direction of magnitude corresponding to that of said stepped waveform.

3. The magnetic recording head arrangement according to claim 2 wherein said magnetic recording gap has a linear contour which provides said recording gap with a continuously varying length along the width of said recording gap.

4. The magnetic recording head arrangement according to claim 2 wherein said magnetic recording gap has an exponential contour.

5. The magnetic recording head arrangement according to claim 2 wherein said magnetic recording gap has a logarithmic contour.

6. The magnetic recording head arrangement according to claim 2 wherein the means for applying said pulse signal waveform to said magnetic pole structure include a coil wound on a former which is magnetically coupled to each of said pole members and which forms part of the magnetic circuit of the magnetic recording head.

7. The magnetic recording head arrangement according to claim 6 wherein said former and said pole members form an integral magnetic pole structure.

8. The magnetic recording head arrangement according to claim 7 wherein the magnetic pole structure is in the form of a hollow rectangular in cross section, and said pole members define the recording gap along a corner edge of the magnetic pole structure.